United States Patent [19]
Krakowiak et al.

[11] Patent Number: 5,979,920
[45] Date of Patent: Nov. 9, 1999

[54] JOUNCE STOP APPARATUS FOR USE IN A VEHICLE SUSPENSION

[75] Inventors: Jeffrey Michael Krakowiak, Livonia; Michael Stephens Martin, Dearborn; Naresh Vermani, Canton; Stacy Priest Nadeau, Dearborn, all of Mich.

[73] Assignee: Ford Global Technologies, Inc., Dearborn, Mich.

[21] Appl. No.: 09/044,061

[22] Filed: Mar. 19, 1998

[51] Int. Cl.⁶ .................................. B60G 11/10; F16F 1/36
[52] U.S. Cl. .......................... 280/124.175; 280/124.177; 301/137; 267/153
[58] Field of Search ................. 280/124.17, 124.175, 280/124.165, 124.177; 301/124.1, 125, 137; 267/30, 52, 292, 153

[56] References Cited

U.S. PATENT DOCUMENTS

| | | | |
|---|---|---|---|
| 2,733,059 | 1/1956 | Van Raden . | |
| 2,735,673 | 2/1956 | Muller | 267/292 |
| 2,741,491 | 4/1956 | Van Raden . | |
| 2,813,712 | 11/1957 | Stanis | 267/292 |
| 3,799,571 | 3/1974 | Sudberry | 280/124.175 |
| 3,913,937 | 10/1975 | Longworth et al. | 267/52 |
| 4,084,838 | 4/1978 | von der Bruck et al. . | |
| 4,324,417 | 4/1982 | Johansson . | |
| 4,458,605 | 7/1984 | Herring, Jr. et al. . | |
| 4,505,457 | 3/1985 | Okada et al. . | |
| 4,796,910 | 1/1989 | Starr, Sr. | 267/30 |
| 5,535,993 | 7/1996 | Hansen . | |
| 5,725,203 | 3/1998 | Lloyd | 267/292 |

FOREIGN PATENT DOCUMENTS 2-241812 9/1990 Japan .

Primary Examiner—Paul N. Dickson
Assistant Examiner—Lynda Jasmin
Attorney, Agent, or Firm—Gregory P. Brown

[57] ABSTRACT

A jounce stop apparatus for use in a motor vehicle includes a resilient jounce bumper (36) attached to a frame member and a jounce bumper barrier (50) attached to an axle housing (12) for receiving the resilient jounce bumper and thereby limiting upward travel of the axle housing. The jounce bumper barrier includes a first portion (54) for attaching the jounce bumper barrier to the axle housing. Second, third and fourth portions (58, 62, 72) are arranged to generally form a U-shape. The third portion (62) includes an impact face (68) for receiving the jounce bumper during extreme upward travel of the axle housing relative to the frame.

16 Claims, 2 Drawing Sheets

JOUNCE STOP APPARATUS FOR USE IN A VEHICLE SUSPENSION

BACKGROUND OF THE INVENTION

1. Field of the Invention

The present invention relates generally to suspensions for motor vehicles. More particularly the present invention relates to an improved jounce stop apparatus which is less expensive and lighter weight than previous jounce stop apparatus.

2. Disclosure Information

It is well known to incorporate jounce bumpers in the design of motor vehicles to limit the upward travel of suspension components beyond a predetermined limit. Commonly, an elastomeric body is located either on the structure of the vehicle or on a suspension member, in a position allowing it to impact either a suspension member or the structure of the vehicle in the latter case. Referring to FIG. 2, an elastomeric body (not shown) would be rigidly secured to a frame member (not shown) in a position above a cantilevered arm 1 mounted on an axle housing 3. Alternatively, some vehicles allow the elastomeric body to impact directly with the axle housing, a leaf spring 5 or a suspension arm in those suspensions having coil springs and suspension arms.

The cantilevered arms of the type shown are metal castings and generally are quite heavy. Additionally, due to the strength requirements necessitated by the cantilevered design, they incorporate substantial material and weight so as to withstand the moments created by repeated impacts with the jounce bumper.

For these reasons, it would be desirable to provide a jounce stop apparatus that addresses the shortcomings of the type employing cantilevered arm designs.

SUMMARY OF THE INVENTION

Therefore, the present invention provides an improvement over the cantilevered type jounce stop apparatus by providing a stamped metal component with features that allowing a lighter and lower cost unit than those of the cantilevered arm type.

In accordance with the present invention, a jounce stop apparatus for use in a motor vehicle having an axle housing constructed to rotatably support a road wheel, a frame and suspension components interconnecting the axle housing and the frame for relative movement therebetween has been discovered. The jounce stop apparatus includes a resilient jounce bumper adapted for attachment to the frame and a jounce bumper barrier having a longitudinal axis and being adapted for attachment to the axle housing so as to receive the resilient jounce bumper and thereby limit upward travel of the axle housing.

The jounce bumper barrier itself includes a first portion having first and second ends, the first portion being adapted for attaching the jounce bumper barrier to the axle housing. A second portion begins at the second end of the first portion and extends away therefrom at a second predetermined angle relative to the longitudinal axis for a first predetermined distance to a third end. A third portion begins at the third end of the second portion and extends substantially parallel to the longitudinal axis to a fourth end. The third portion also includes an impact face for receiving the jounce bumper during extreme upward travel of the axle housing relative to the frame. A fourth portion begins at the fourth end of the third portion and extends away therefrom at a third predetermined angle relative to the longitudinal axis for a second predetermined distance to a fifth end. Together, the second and third predetermined angles are selected such that the second, third and fourth portions generally form a U-shape.

It is an advantage of the present invention to provide a simple, low cost jounce stopper apparatus of providing greater package flexibility for the suspension than previously possible.

DETAILED DESCRIPTION OF THE PREFERRED EMBODIMENT

Figure 1:
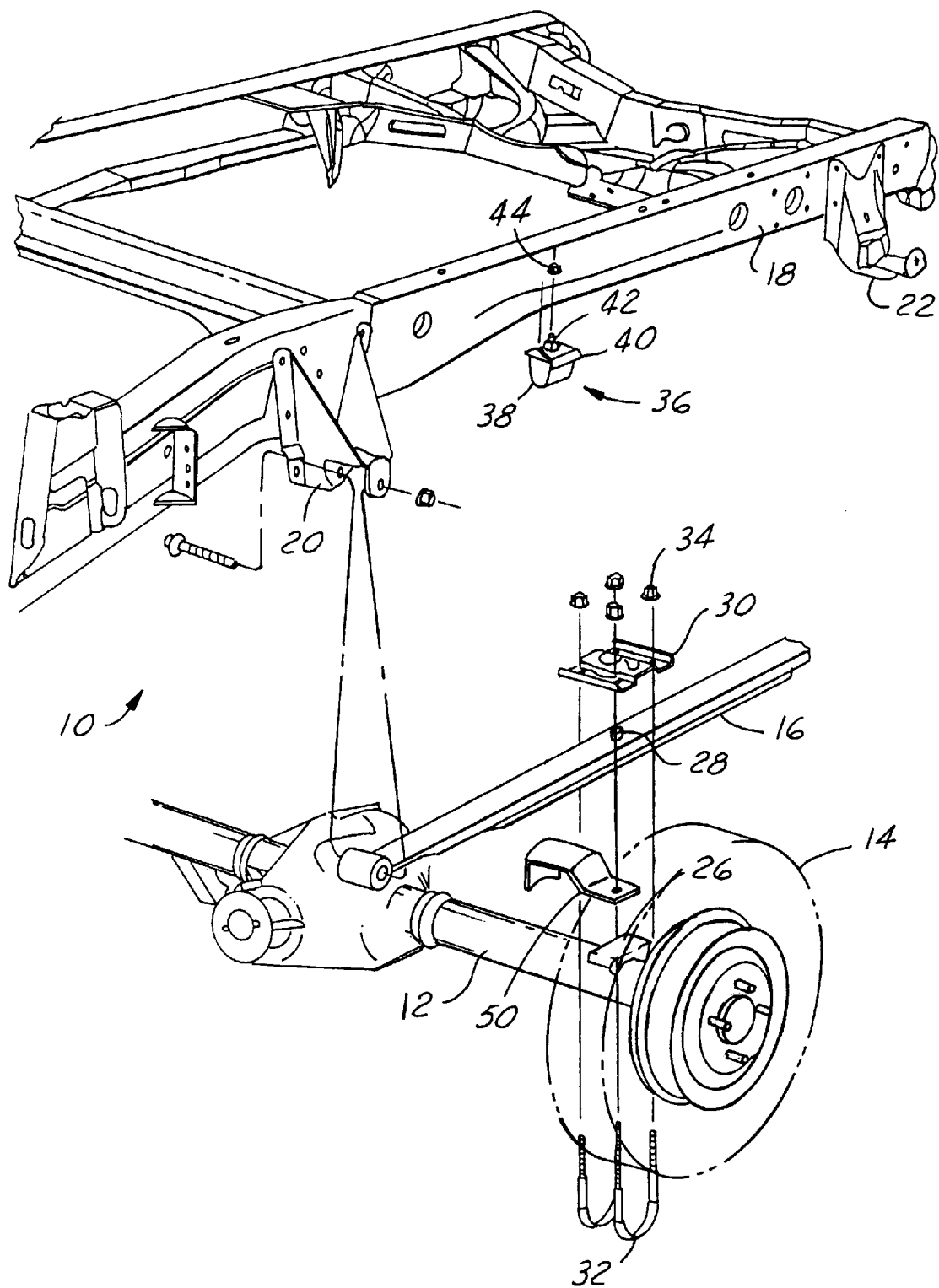
FIG. 1 is a partially exploded perspective view of a frame and suspension for a motor vehicle.
Figure 2:
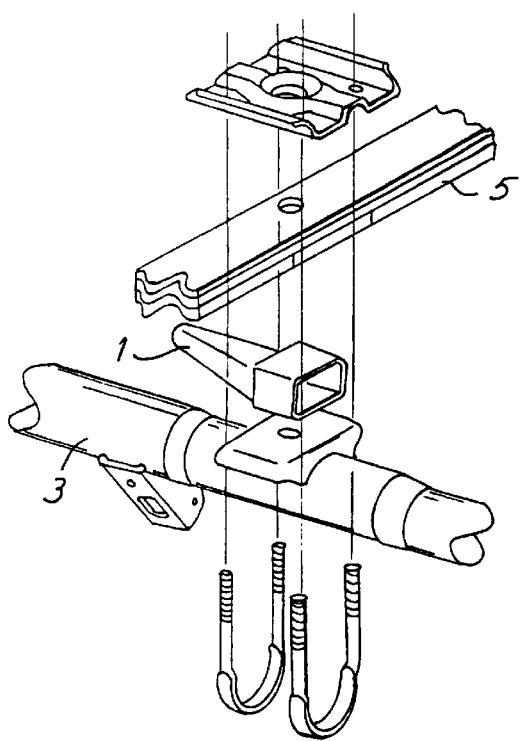
FIG. 2 is a partially exploded perspective view of a prior art jounce bumper stop used in a motor vehicle suspension.

Referring now to FIG. 1, a typical vehicle suspension system 10 is shown including a rear axle housing 12 rotatably supporting a road wheel 14. For clarity and brevity, only the rear left side of the vehicle will be described, it being understood that the suspension is generally symmetric, with similar parts being found on a right side of the vehicle. Additionally, the present invention applies equally to front or rear suspensions. A single leaf spring or a spring pack 16 interconnects the axle housing 12 to a frame member 18 allowing jounce and rebound movements therebetween.

It should also be noted that the present invention will be described in relation to a vehicle having body on frame construction, however, the present invention applies equally to a motor vehicle having a unibody structure wherein rear side rails, alone or in combination with a sub-frame, provides the structural support provided by the longitudinal frame members and they are constructed as integral components of the floor pan.

A front spring shackle 20 and a rear spring shackle 22 provide attachment of the spring pack 16 to the frame 18. A spring seat 26 welded to the axle housing receives a guide pin 28 located in the spring pack 16 and cooperates with a spring plate 30 to securely clamp the spring pack 16 to the axle housing 12 using U-bolts 32 and threaded nuts 34.

A resilient jounce bumper 36 includes a elastomeric body 38 bonded to a base plate 40 which is fastened to the frame member 18 by a threaded rod 42 and threaded nut 44. The resilient jounce bumper 36 is located longitudinally on the frame at a position that allows impact with a jounce bumper barrier 50 mounted on the axle housing 12 under severe jounce travel.

Figure 3:
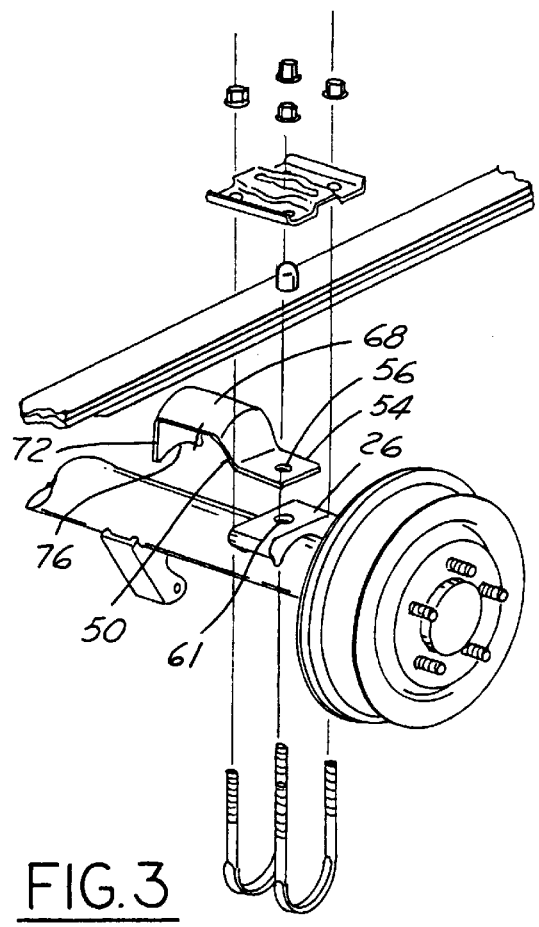
FIG. 3 is a partially exploded perspective view of a jounce bumper barrier for use in a motor vehicle suspension constructed in accordance with the present invention.
Figure 4:
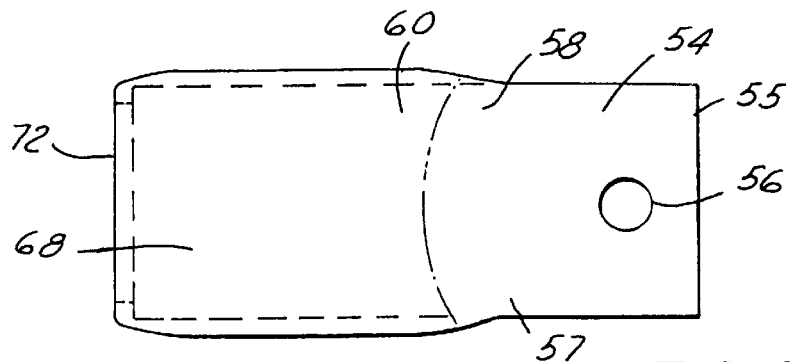
FIG. 4 is a plan view of a jounce bumper barrier for use in a motor vehicle suspension constructed in accordance with the present invention.
Figure 5:
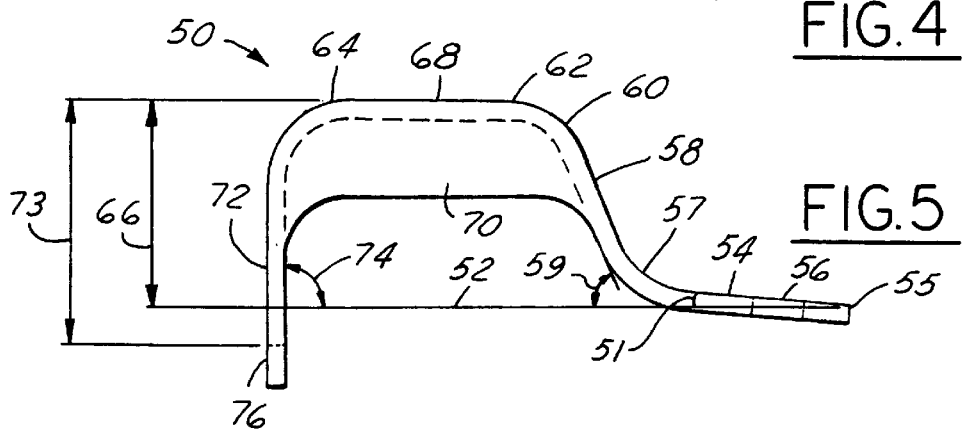
FIG. 5 is an elevational view of a jounce bumper barrier for use in a motor vehicle suspension constructed in accordance with the present invention.

Referring now to FIGS. 3–5, a jounce bumper barrier 50 according to the present invention is shown as it is used on an axle housing 12. The longitudinal axis 52 of the jounce bumper barrier 50 aligns with the longitudinal axis of the axle housing 12. A first portion 54 of the jounce bumper barrier 50 is stamped to match the shape of the spring seat 26, which in the illustrated embodiment is substantially planar and includes first and second ends 55, 57. The first portion 54 also includes an aperture 56 located to align with an aperture 61 in the spring seat 26, both for receiving the guide pin 28 in the spring pack 16. With the spring plate 30 securely clamped to the axle housing 12, the first portion 54 of the jounce bumper barrier 50 is rigidly sandwiched to the axle housing 12. Additionally, the first portion 54 may be stamped to form a first predetermined angle 51 relative to the longitudinal axis 52 prior to installation.

A second portion 58 of the jounce bumper barrier extends away from the second end 57 of the first portion 54 at a second predetermined angle 59 relative to the longitudinal axis 52 upward to a third end 60. A third portion 62 extends from the third end 60 substantially parallel to the longitudinal axis 52 to a fourth end 64. The second portion extends upward a first predetermined distance 66 to position an impact face 68 of the third portion 62 at a desired height for engaging the resilient jounce bumper 36. The third portion 62 may also include skirts 70 extending between the third and fourth ends 60, 64 along either side of the impact face. The skirts 70 provide additional strength to withstand the compressive loading imposed by impact with the resilient jounce bumper 36. In the presently preferred embodiment, the impact face 68 and the skirts 70 form an arcuate surface transverse to the longitudinal axis 52, substantially parallel to an outer surface of the axle housing 12. Providing an arcuate surface in this manner reduces the moments imparted on the axle housing in the event the resilient jounce bumper strikes the impact face off center.

A fourth portion 72 of the jounce bumper barrier extends away from the fourth end 64 of the third portion 62 for a second predetermined distance 73 and at a third predetermined angle 74 relative to the longitudinal axis 52 downward to a fifth end 76. The fifth end 76 is semi-circular shaped when viewed along the longitudinal axis so as to matingly engage the outer surface of the axle housing 12 upon installation. This aids in retaining the jounce bumper barrier under off-center impacts by reacting the moments that would act to unseat the first portion from the spring seat, as well as providing increased bearing surface for distributing compressive loads into the axle housing during centered impacts with the jounce bumper 36.

The second and third predetermined angles 59, 74 are selected such that the second, third and fourth portions 58, 62, 72 generally form a U-shape. The first and second predetermined angles 51, 59 and the first and second predetermined distances 66 and 73 are selected to urge the fifth end 76 into continuous contact with the axle housing 12. This prevents the jounce bumper barrier from making noise as it is forced in compression against the axle housing 12 each time the jounce bumper 36 strikes the impact face 68, thus eliminating the need for a separate fastener or weldment.

It is desirable to stamp the jounce bumper barrier 50 from a single piece of sheet metal. This provides considerable weight savings and manufacturing costs over alternative methods of manufacture that would otherwise provide equivalent operability. In the presently preferred embodiment, a sheet steel such as SAE CR1040 having a metal thickness of 3/16" has been sufficient for the intended design.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A jounce stop apparatus for use in a motor vehicle having an axle housing constructed to rotatably support a road wheel, a frame and suspension components interconnecting the axle housing and the frame for relative movement therebetween, said jounce stop apparatus comprising:
    a resilient jounce bumper adapted for attachment to the frame;
    a jounce bumper barrier having a longitudinal axis and being adapted for attachment to the axle housing so as to receive said resilient jounce bumper and thereby limit upward travel of the axle housing, said jounce bumper barrier comprising:
        a first portion having first and second ends, said first portion being adapted for attaching said jounce bumper barrier to the axle housing;
        a second portion beginning at said second end of said first portion and extending away therefrom at a second predetermined angle relative to said longitudinal axis for a first predetermined distance to a third end;
        a third portion beginning at said third end of said second portion and extending substantially parallel to said longitudinal axis to a fourth end, said third portion including an impact face for receiving said jounce bumper; and
        a fourth portion beginning at said fourth end of said third portion and extending away therefrom at a third predetermined angle relative to said longitudinal axis for a second predetermined distance to a fifth end;
    wherein said second and third predetermined angles are selected such that said second, third and fourth portions generally form a U-shape.

2. The jounce stop apparatus according to claim 1, wherein said first portion is substantially planar and formed with a first predetermined angle relative to said longitudinal axis, whereby said first, second and third predetermined angles together with said second predetermined distance cooperate upon installation of said jounce bumper barrier on the axle housing to urge said fifth end into contact with the axle housing.

3. The jounce stop apparatus according to claim 1, wherein said fifth end is semi-circular shaped when viewed along said longitudinal axis for matingly engaging the axle housing, thereby providing increased bearing surface for distributing compressive loads resulting from said jounce bumper impacting said jounce bumper barrier.

4. The jounce stop apparatus according to claim 1, wherein said first portion is substantially planar and includes an aperture disposed therethrough for receiving a locating pin disposed in a spring pack, said first portion being adapted to be sandwiched between said spring pack and a spring seat disposed on the axle housing thereby providing rigid attachment of said jounce bumper barrier to the axle housing.

5. The jounce stop apparatus according to claim 1, wherein said jounce bumper barrier is stamped from a single piece of metal.

6. The jounce stop apparatus according to claim 1, wherein said impact face of said third portion is arcuately formed transverse to the longitudinal axis of said jounce bumper barrier thereby minimizing moments created by off center impacts between said impact face and said jounce bumper.

7. A jounce stop apparatus for use in a motor vehicle having an axle housing constructed to rotatably support a road wheel, a frame and suspension components interconnecting the axle housing and the frame for relative movement therebetween, said jounce stop apparatus comprising:

a resilient jounce bumper adapted for attachment to the frame;

a jounce bumper barrier having a longitudinal axis and being adapted for attachment to the axle housing so as to receive said resilient jounce bumper and thereby limit upward travel of the axle housing, said jounce bumper barrier comprising:

a first portion having first and second ends, said first portion being adapted for attaching said jounce bumper barrier to the axle housing;

a second portion beginning at said second end of said first portion and extending away therefrom at a second predetermined angle relative to said longitudinal axis for a first predetermined distance to a third end;

a third portion beginning at said third end of said second portion and extending substantially parallel to said longitudinal axis to a fourth end, said third portion including an impact face for receiving said jounce bumper; and a fourth portion beginning at said fourth end of said third portion and extending away therefrom at a third predetermined angle relative to said longitudinal axis for a second predetermined distance to a fifth end;

said fifth end having a semi-circular shape when viewed along said longitudinal axis for matingly engaging an outer surface of the axle housing;

wherein said second and third predetermined angles are selected such that said second, third and fourth portions generally form a U-shape.

8. The jounce stop apparatus according to claim 7, wherein said first portion is substantially planar and formed with a first predetermined angle relative to said longitudinal axis, whereby said first, second and third predetermined angles in combination with said second predetermined distance cooperate upon installation of said jounce bumper barrier on the axle housing to urge said fifth end into contact with the axle housing.

9. The jounce stop apparatus according to claim 7, wherein said first portion is substantially planar and includes an aperture disposed therethrough for receiving a locating pin disposed in a spring pack, said first portion being adapted to be sandwiched between said spring pack and a spring seat disposed on the axle housing thereby providing rigid attachment of said jounce bumper barrier to the axle housing.

10. The jounce stop apparatus according to claim 7, wherein said jounce bumper barrier is stamped from a single piece of metal.

11. The jounce stop apparatus according to claim 7, wherein said impact face of said third portion is arcuately formed transverse to the longitudinal axis of said jounce bumper barrier thereby minimizing moments created by off center impacts between said impact face and said jounce bumper.

12. A jounce stop apparatus for use in a motor vehicle having an axle housing constructed to rotatably support a road wheel, a frame and a leaf spring interconnecting the axle housing and the frame for relative movement therebetween, said jounce stop apparatus comprising:

a resilient jounce bumper adapted for attachment to the frame;

a jounce bumper barrier having a longitudinal axis and being adapted for attachment to the axle housing so as to receive said resilient jounce bumper and thereby limit upward travel of the axle housing, said jounce bumper barrier comprising:

a first portion having first and second ends, said first portion being substantially planar and having an aperture therethrough for receiving a locating pin disposed in the leaf spring, said first portion being clamped between said leaf spring and a spring seat disposed on the axle housing wherein said locating pin extends through said aperture into said spring seat, thereby providing secure attachment of said jounce bumper barrier to the axle housing;

a second portion beginning at said second end of said first portion and extending away therefrom at a second predetermined angle relative to said longitudinal axis for a first predetermined distance to a third end;

a third portion beginning at said third end of said second portion and extending substantially parallel to said longitudinal axis to a fourth end, said third portion including an impact face for receiving said jounce bumper; and a fourth portion beginning at said fourth end of said third portion and extending away therefrom at a third predetermined angle relative to said longitudinal axis for a second predetermined distance to a fifth end;

wherein said second and third predetermined angles are selected such that said second, third and fourth portions generally form a U-shape.

13. The jounce stop apparatus according to claim 12, wherein said first portion is formed with a first predetermined angle relative to said longitudinal axis, whereby said first, second and third predetermined angles together with said second predetermined distance cooperate upon installation of said jounce bumper barrier on the axle housing to urge said fifth end into contact with the axle housing.

14. The jounce stop apparatus according to claim 13, wherein said fifth end is semi-circular shaped when viewed along said longitudinal axis for matingly engaging the axle housing, thereby providing increased bearing surface for distributing compressive loads resulting from said jounce bumper impacting said jounce bumper barrier.

15. The jounce stop apparatus according to claim 12, wherein said jounce bumper barrier is stamped from a single piece of metal.

16. The jounce stop apparatus according to claim 12, wherein said impact face of said third portion is arcuately formed transverse to the longitudinal axis of said jounce bumper barrier thereby minimizing moments created by off center impacts between said impact face and said jounce bumper.

\* \* \* \* \*